June 4, 1929. J. S. KNIGHT 1,716,141
DEVICE FOR OPERATING BOWDEN CABLES AND THE LIKE
Filed March 26, 1927 2 Sheets-Sheet 1
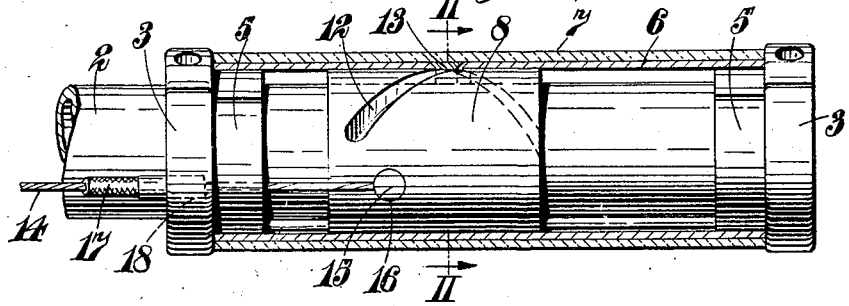
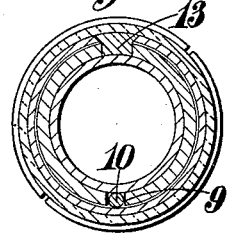 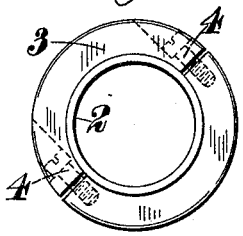
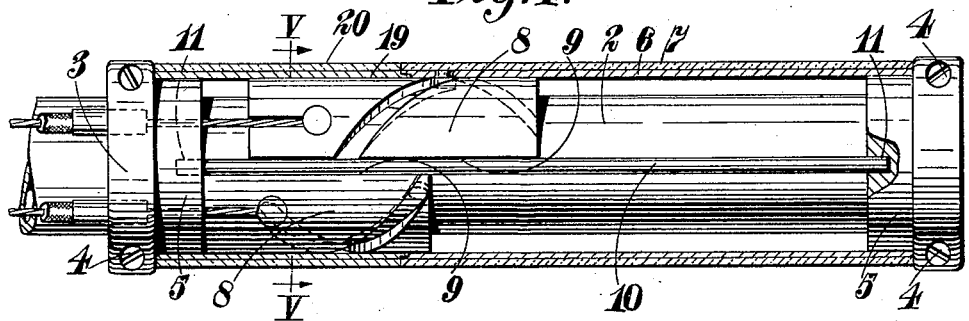
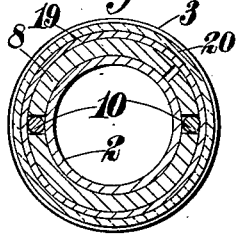 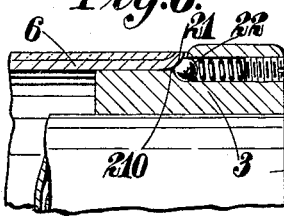 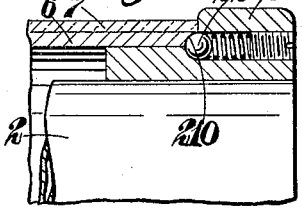
James Scott Knight
Inventor
his Attorney June 4, 1929.  J. S. KNIGHT  1,716,141
DEVICE FOR OPERATING BOWDEN CABLES AND THE LIKE
Filed March 26, 1927   2 Sheets-Sheet 2
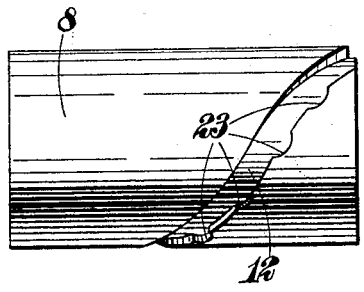
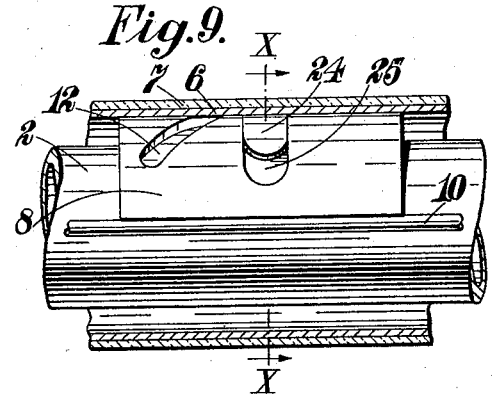
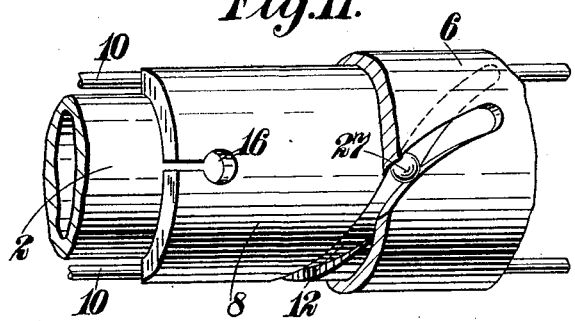
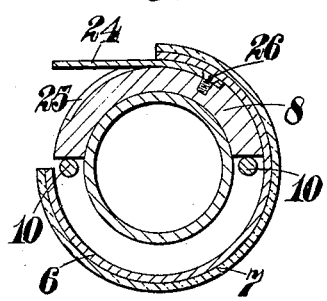
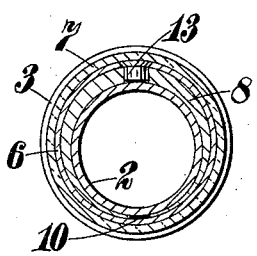
James Scott Knight
Inventor
by Edwin Daulinkly
his Attorney Patented June 4, 1929.

1,716,141

UNITED STATES PATENT OFFICE.

JAMES SCOTT KNIGHT, OF SOUTHGATE, ENGLAND, ASSIGNOR TO A. M. A. C. LIMITED, OF BIRMINGHAM, ENGLAND, A BRITISH COMPANY.

DEVICE FOR OPERATING BOWDEN CABLES AND THE LIKE.

Application filed March 26, 1927, Serial No. 178,805, and in Great Britain April 13, 1926.

This invention relates to apparatus for operating Bowden control cables and the like, known as twist-grip controls, such as are employed upon motor cycles, but is not limited to use thereon.

The principal object of the invention is to provide a construction having few but simple parts and in which the overall diameter of the control can be made smaller than usual. Further objects are to enable the interior parts to be easily examined, and to decrease the cost of manufacture and assembly.

In the accompanying drawings,

Figure 1 is an elevation partly in section showing one form of the invention,

Figure 2 is a cross section on the line II, II of Figure 1,

Figure 3 is an end view of Figure 1,

Figure 4 is a view similar to Figure 1 but showing a double control,

Figure 5 is a cross section on the line V, V of Figure 4,

Figures 6 and 7 respectively are fragmentary sections on a longitudinal axis of the control showing alternative resilient locking devices, Figure 8 is an elevation of the saddle piece of the control showing another form of resilient locking device, Figure 9 shows a spring friction device for braking the movements of the control, Figure 10 is a cross section on the line X, X of Figure 9, Figure 11 is a fragmentary elevation of a modified construction of the pin-and-helical-slot mechanism, and Figure 12 is a cross section of a control showing a modification in the form of the saddle piece.

Like numerals indicate like parts throughout the drawings.

Upon the handlebar 2 or equivalent support is provided a pair of divided collars 3 which are drawn together by tangentially arranged screws 4 to cause them to grip the bar, and if preferred they may be further secured against movement by radially arranged pins or screws engaging the handlebar. These collars have a reduced portion 5 upon which is supported, rotatably free and endwise fast, the twisting grip tube 6 which may be surrounded with a sleeve 7 of rubber or other composition.

Slidably mounted between the reduced parts 5 of the collar in the annular space between the handlebar and the twist-grip tube is a saddle piece 8. This is constituted by a split sleeve, and the edges 9 of the sleeve engage opposite sides of a guide bar 10, the ends of which are located by engagement with holes 11 (Figure 4) provided in the split collars 3. The bar 10 thus forms a guide for the saddle piece and prevents it turning around the handlebar 2, and the limits of travel of the saddle are defined by the split collars.

In the saddle piece is formed a helical slot 12 which is engaged by the inwardly projecting pin 13 carried on the twist-grip tube, so that the rotation of the twist-grip causes the saddle to travel longitudinally along the handlebar, and thereby to operate the cable 14 which is attached to the usual block 15 mounted in a recess 16 in the saddle piece. The outer casing 17 for the cable is anchored in a recess 18 in the collar 3 in the known manner, and the cable 14 extends slidably through the collar for attachment to the saddle piece.

In Figure 4 is shown a modification in which two controls can be arranged in a space not much greater than is required for one. Herein there are two saddle pieces 8, each extending about half round the handlebar from opposite sides so that their edges 9 are guided by opposite sides of a pair of bars 10 arranged diametrically opposite to one another and supported on the collar 3 as in the previous construction. An additional twist-grip tube 19 placed end-for-end with the other tube 6 is provided to operate the second saddle piece and control, the tube 19 being provided with a sleeve of suitable material 20 corresponding to the sleeve 7. The abutting ends of the two tubes 6 and 19 may be engaged by a register so that they mutually support one another at this position.

To provide for holding the twist-grip tube at various positions of its movement, its end may be flared as shown at 21, (Figure 6) and indentations or notches 210 may be made at intervals around the inner flared surface for engagement by a spring pressed plunger or ball 22 mounted in the collar 3. In Figure 7 a similar arrangement is shown, but instead of flaring the end of the tube 6, the notches are formed in its edge for engagement by the ball. Obviously such an arrangement applies equally to the tube 19.

In Figure 8 an alternative arrangement is shown for holding the control at various positions. This is effected by providing notches 23 at suitable positions along that side of the helical groove which is resiliently pulled against the pin 13 by the action of the cable 14. Thus a positive engagement will take place at each notch.

To prevent uncontrolled movement of the twist-grip tube, spring blades 24 (Figures 9 and 10) may be secured to the saddle so as normally to lie in recesses 25 therein and to bear resiliently on the inner side of the twist-grip tube. Obviously these blades can be mounted in the reduced portions 5 of the collars 3, and in each case extend circumferentially from their point of attachment 26.

As a modification of the pin-and-slot connection a helical groove can be formed not only in the saddle piece 8 but also in the twist-grip tube, and these may be connected by a ball 27. It will be noted in Figure 11 that the direction of inclination of both slots is the same but they need not necessarily coincide and the angle of the slot in the sleeve may be less than that in the tube, as shown, or it may be the same, or if preferred somewhat greater.

In Figure 12, which illustrates in cross section a single control of the kind shown in Figures 1-3, the saddle piece has its exterior surface eccentric to the interior so as to retain a sufficient thickness in one part for the formation of the helical groove, whilst at the same time reducing the external diameter of the saddle piece. The twist grip tube can then closely embrace the saddle and consequently could be made of smaller diameter than would otherwise be the case if the saddle piece were concentrically formed, as in Figure 1. In view of the thinness of the split edges 9 of the saddle, the guide bar 10 may be of rectangular section as shown. Obviously, if preferred, it might be made rectangular in any of the foregoing constructions and its ends could be reduced to circular form to fit in the circular section holes provided in the collars 3 for locating and supporting the bar.

From the foregoing it will be seen that the various constructions are of a simple nature having relatively few parts and all of these readily accessible for inspection merely by removing the outer collar 3 when the twist-grip tube can be drawn off, and the connections of the cables to the saddle piece are fully exposed. The control also can be made relatively small in diameter and the double control does not greatly exceed the length of the single one.

What I claim as my invention and desire to secure by Letters Patent of the United States is:—

1. In a twist-grip control for operating transmission rods and cables, the combination of a support, a member outside said support longitudinally slidable thereon and having the transmission element attached to it and arranged outside said support, a guide member extending along the outside of said support and engaged by said movable member, a twisting tube surrounding said slidable member and said support, a groove in said slidable member inclined to its direction of movement, and an operating element adapted to engage said groove and said twisting tube so that the slidable member moves as the tube rotates, substantially as set forth.

2. A twist-grip control as claimed in claim 1, in which the slidable member is a saddle piece constituted by a split sleeve, the edges of the split engaging a guide member in the form of a bar extending along the support, substantially as set forth.

3. A twist-grip control as claimed in claim 1, in which the guide bar has its ends located by engagement with collars which also support the ends of the twisting sleeve and prevent its endwise movement, substantially as set forth.

4. A twist-grip control as claimed in claim 1, in which the saddle piece extends only partially round the support and at its edge is guided by a pair of bars arranged opposite one another on the support, whilst a second saddle piece is provided on the side of the support opposite the first one, and is guided by the aforesaid bars and controlled by a second twist sleeve mounted end to end with the first one, substantially as set forth.

5. A twist-grip control as claimed in claim 1, in which a locating device is provided between the end of the twisting tube and a collar which supports it, comprising a spring pressed ball 22 adapted to engage the notches 210 in the sleeve, substantially as set forth.

6. A twist-grip control as claimed in claim 1, in which the guide bar for the saddle piece constitutes a distance piece for locating spaced collars supporting the twisting tube, substantially as set forth.

7. A twist-grip control as claimed in claim 1, in which a helical groove is formed in the twisting tube and an operative connection with the slidable member is provided by means of a ball engaging the helical grooves in the tube with the inclined groove in the slidable member, substantially as set forth.

In testimony whereof I have signed my name to this specification.

JAMES SCOTT KNIGHT.